Sept. 6, 1927.
A. J. COLEMAN
1,641,320
BREAKING HEAD FOR PIPE AND SEWER RODS
Filed March 17, 1924
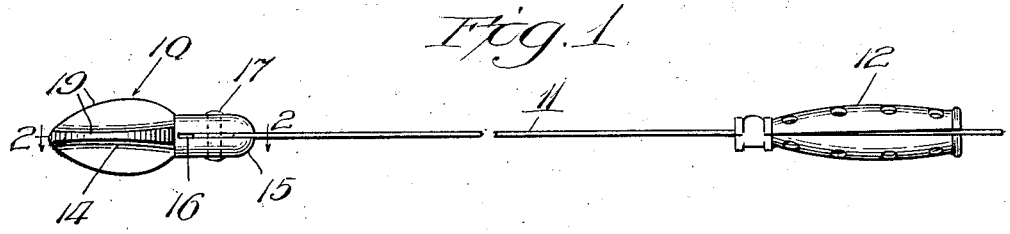
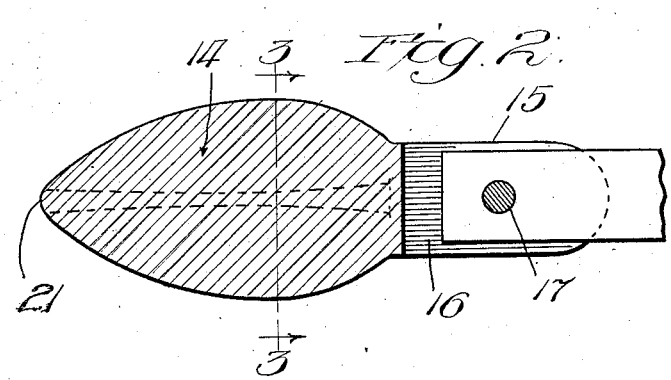
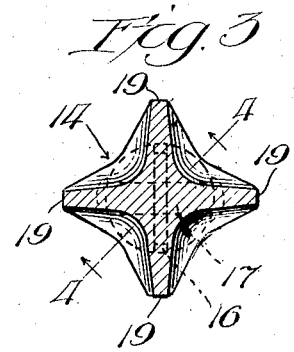
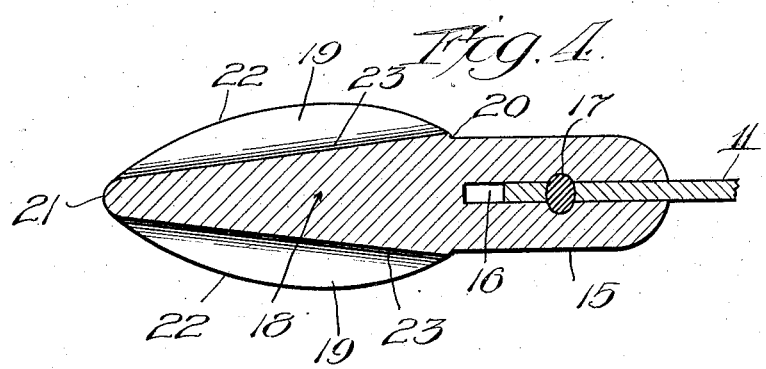
Inventor
Allan J. Coleman
by William H. Hall
Atty Patented Sept. 6, 1927.

1,641,320

UNITED STATES PATENT OFFICE.

ALLAN J. COLEMAN, OF CHICAGO, ILLINOIS.

BREAKING HEAD FOR PIPE AND SEWER RODS.

Application filed March 17, 1924. Serial No. 699,961.

This invention relates to a novel tool or implement for cleaning drain pipes, sewers and the like, and the object of the invention is to produce such a tool or implement in the nature of a spear head properly ribbed for pressure against and insertion through dirt or sediment in a drain or sewer pipe and provided with means for loosely connecting it to the forward end of a suitable flexible rod. The object of the invention is to produce a very simple, economical and rugged implement for this use, and the invention consists in the matters hereinafter set forth and more particularly pointed out in the appended claim.

In the drawings:

Fig. 1 is a side elevation of a cleaning tool embodying my invention, showing a length of rod and a hand grip for manipulating it.

Fig. 2 is an enlarged section on the line 2—2 of Fig. 1.

Fig. 3 is a cross-section on the line 3—3 of Fig. 2.

Fig. 4 is an oblique section on the line 4—4 of Fig. 3.

As shown in the drawing, 10 designates, as a whole, my improved cleaning and dislodging implement, 11 designates a rod to the forward end of which said implement is attached, and 12 designates a hand grip for manual engagement by the hand of the operator to manipulate the rod and implement. The hand grip herein shown is like that described and claimed in my copending application for U. S. Letters Patent Serial No. 699,960, filed on the 17th day of March, 1924.

The cleaning or dislodging implement 10 is of general spear point formation. It is made of a single piece of cast metal and comprises, in general terms, a body portion 14 and a shank portion 15, the latter being slitted at 16 to receive the flat rod 11. Said rod 11 is shown as fixed to the implement by a through pin or rivet 17. The forward end of the rod terminates short of the forward end of the slit 16 so that the implement can have pivotal movement about the rod in the plane of the latter. Pivotal movement in the other direction is afforded by the resilient flexibility of the rod when made flat, as herein shown. Thus in introducing the implement into a clogged drain or sewer pipe, the said implement is free to pivot in all directions so as to pass around an impenetrable obstruction.

The head or implement 10 comprises a central solid body 18 and a plurality of radial ribs 19 disposed generally parallel to the axis of said body. The said body 18 is forwardly tapered from its largest dimension 20 toward and to the smaller end or nose 21 of the implement, as best shown in Fig. 4. The ribs 19 are relatively deep at their centers. They are oval curved at their outer edges 22 so as to merge at their forward ends into the curved nose 21 and the outer cross-sectional dimension of the body at 20, thus giving to said ribs the form of ovate longitudinal segments, as best shown in Figures 1 and 4.

This form of the ribs 19 and the tapered formation of the body 18 enables the implement to be thrust readily into the dirt or sediment to be removed from the pipe, and the tapered sides 23 of the body, and the ovate curves of the ribs have the effect to expand the material in all directions from the longitudinal axis of the implement and to thereby break down said material. The material can be further broken down by rotating the implement by power applied through the hand grip 12 and the rod 11 so as to further facilitate breaking down the material to be dislodged. The operation of cleaning a pipe with an implement of this type consists of thrusting the implement forward and drawing it backwardly, and the outer curved faces of the ribs may, in the backward movement, serve to assist in dislodging the material.

In practice, this spear head implement has demonstrated its ability to quickly dislodge dirt and sediment from pipes, ready for the removal of the dislodged material. The wedge faces 23 of the body, in connection with the curved margins of the ribs, greatly facilitate the dislodging expansion of the material acted upon, and such dislodgment is also assisted by rotation of the implement, due to the presence of the radial ribs. The forwardly facing wedge-shaped curved surfaces serve also to facilitate the advancement of the implement into the material to be dislodged.

The invention has been herein disclosed by illustrating and describing a preferred embodiment thereof, but it will be understood that other embodiments of the invention may be used within the spirit and scope of the claim hereto appended.

I claim as my invention:

A pipe cleaning device comprising a flat resilient rod, and a head hinged to said rod, so as to be capable of swinging movements about an axis at right angles to the flat faces of the rod and be held against movements in other directions relatively to the rod, said head being tapered toward its outer end and having longitudinal peripheral ribs.

In witness whereof I claim the foregoing as my invention, I hereunto append my signature this 28th day of February, 1924.

ALLAN J. COLEMAN.